Sept. 21, 1965    J. F. EYLER ETAL    3,206,887
TOY COMPRISING PAD PAGES HAVING COMPLEMENTARY ROADS
AND VEHICLE REPRESENTATIONS MOVABLE THEREOVER
Filed May 24, 1962
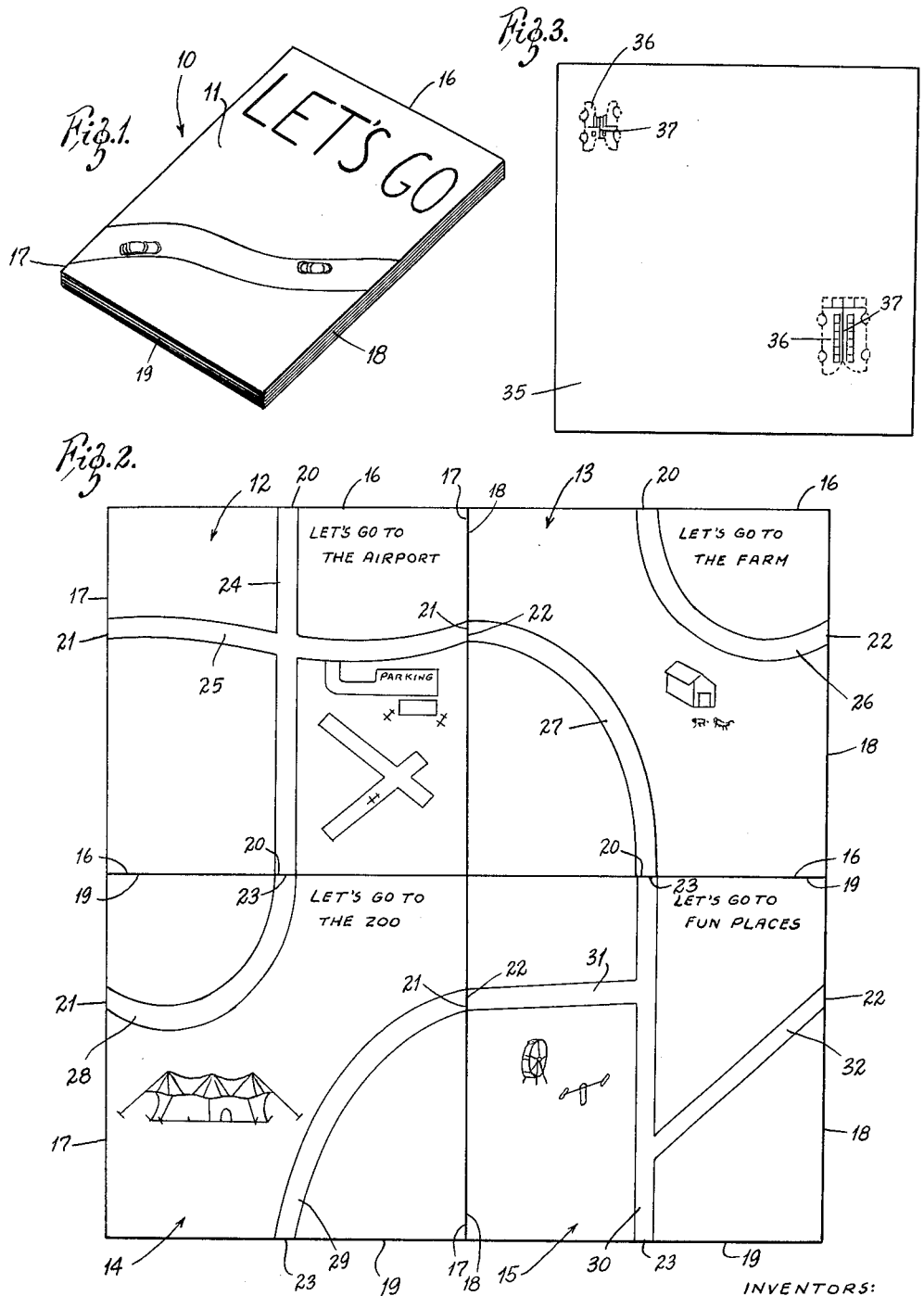
INVENTORS:
JOHN F. EYLER,
CLAUDE R. SIDES,
GENE F. MURRAY,
EDWARD J. COSBY
BY Kingsland, Rogers, Ezell & Robbins
ATTORNEYS

United States Patent Office 3,206,887
Patented Sept. 21, 1965

3,206,887
TOY COMPRISING PAD PAGES HAVING COMPLEMENTARY ROADS AND VEHICLE REPRESENTATIONS MOVABLE THEREOVER
John F. Eyler, St. Louis, Claude R. Sides, Kirkwood, Gene F. Murray, Ballwin, and Edward J. Cosby, Webster Groves, Mo., assignors to CEMS, Inc., St. Louis, Mo., a corporation of Missouri
Filed May 24, 1962, Ser. No. 197,433
3 Claims. (Cl. 46—17)

This invention comprises a child's toy in the form of a book of separable sheets, each having a different landscape drawn on it which provides a background for toy vehicles. The book may be provided in various models with different numbers of pages, and the following description is intended to illustrate one example of many embodiments of the invention.

The book has about twenty pages, but may have some other number. The pages are bound together at one edge as a pad, such that each page can be torn loose from the pad. Each page has a road or roads drawn on it that wind in various directions. The paths of the roads may be different for the several sheets, but on all the sheets, the roads run off the edges of the pages at the same points, all of which complement the run-off points on the diametrically opposite edge of the page. Hence, any or all the pages can be torn from the pad and laid out in edge-to-edge relationship, and the total layout will have a number of roads that run continuously from page to page.

One of the attractive aspects of this invention is that each page has different illustrations accompanying its roads. One may have a zoo, another a park, another a shopping center, etc. Furthermore, different series of pads may be produced, such as a series of different cities, states or countries, or other planets, from which children can learn geography while they play.

It is preferable that about four pages have only roads drawn on them without the accompanying physical environment. Such pages are included to allow children to add their own conceptions of geographical environment. If a child has a special desire to go to a particular place, such as a fire station or an amusement park, he can draw illustrations of such a place on one of the blank sheets and use it along with the other pages.

Finally, one of the sheets, preferably the last, is made of heavier paper or cardboard and is provided with drawings of vehicles that may be cut out or are perforated so they can be punched out. The provisions of these vehicles makes the book a complete toy to which no accessories need be added, but it is also possible to use the pages as roadways for vehicles a child may already own.

The general object of this invention is to provide a self-contained toy for the amusement and education of children which is in the form of a book or pad of pages, each with a road layout which children can drive toy vehicles.

Another object of the invention is to provide a plurality of sheets with different road layouts and accompanying geographical designs which can be arranged edge-to-edge to make a larger composite road layout.

Still another object of the invention is to provide a pad of pages of different roadway designs suggesting different places to drive a vehicle so that a child may select pages according to his current interests.

Other objects and advantages will be apparent from the drawings and description of this invention.

In the drawing:
FIGURE 1 is an isometric view of a pad of pages representing this invention;
FIGURE 2 is a plan view of four typical pages torn from the pad and laid edge to edge; and
FIGURE 3 is a plan view of a page that has vehicles drawn on it for use with the other pages.

Referring now to the drawing, the book 10 is illustrated in FIGURE 1. It has a cover 11 which illustrates the nature of the toy, and beneath the cover there are a plurality of pages, preferably about twenty. Four examples, 12, 13, 14 and 15 of such pages are illustrated in FIGURE 2. All of the pages like the pages 12 through 15 of FIGURE 2 are initially provided in the book with common edges bound together as a pad with a binding that permits each page to be torn away from the pad without tearing the page. Any of the conventional bindings which are suitable for this purpose may be used on the book 10.

Each of the pages 12 through 15 is rectangular, with four edges 16, 17, 18 and 19. They are illustrated as being square with about thirty inch sides, but different sizes and shapes, such as 19 by 24 inches, are readily feasible and workable. While the designs on the different pages 12 through 15 are different, each page has roads on it which run off the page at identical points 20, 21, 22 and 23. For example, the page 12 has two roads 24 and 25 that cross, the road 24 running between the points 20 and 23 and the road 25 running between the points 21 and 22. The sheet 13 has two roads 26 and 27 that run in different directions with the road 26 extending between the points 20 and 22 and the road 27 between the points 21 and 23. The sheet 14 has two roads 28 and 29 with the road 28 extending between the points 20 and 21 and the road 29 extending between the points 22 and 23. The pages 15 has a road 30 extending between the points 20 and 23 with one offshoot 31 extending to the point 21 and another offshoot 32 extending to the point 22.

In FIGURE 2, the four sample pages 12, 13, 14 and 15 have been laid out edge-to-edge. When this is done, it is apparent that the various roads continue onto adjacent sheets.

For example, the road 25 merges into the road 27 which in turn continues on the page 15 as the road 30. Similarly, the other roads are connected wherever edges of the pages 12 through 15 abut one another. This continuity of road layout is made possible by the identity of cutoff points 20 through 23 on all of the pages even though on each page the roads may extend or wind in various directions.

In the example of pages illustrated in FIGURE 2, each page has different locations of interest drawn on it. One of the pages 12, has an airport drawn on it with the legend "Lets' Go to the Airport." Another of the pages 13 has a farm with the legend "Let's Go to the Farm." Another page 14, has a legend "Let's Go to the Zoo" and the other page 15, has an amusement park with Ferris wheels and the like, with the legend "Let's Go to Fun Places."

The arrangement of these pages may be changed according to where a child wants to go, and in any arrangement of pages, the roads will always adjoin and be continuous over the plurality of sheets. Of course, some of the roads may be separated to provide more than one road as indicated by the road 26 on the page 13. This is a separate road that could be extended if additional pages were laid against the edges 16 and 18 of the page 13.

FIGURE 3 illustrates a different page 35 that is not like the pages 12 through 15. The page 35 is preferably of heavy or stiff paper or cardboard and has a plurality of vehicles 36 drawn on it. Two sides of each vehicle are drawn and the outlines of the vehicles are preferably perforated except for the line 37 at which the two sides are joined. These cars 36 can be punched out of the page 35 and folded about their adjoining line 37 to be used on the sheets of roads 12 through 15.

Various changes and modifications may be made within the process of this invention as will be readily apparent to those skilled in the art. Such changes and modifications are within the scope and teaching of this invention as defined by the claims appended hereto.

What is claimed is:

1. A self-contained toy comprising a plurality of pages fastened together along one edge of each to provide a pad, each page being removable from the pad, at least one of the pages being of heavy grade paper and having vehicle representations depicted on it for removal from the page, at least some of the remaining pages having roads depicted on them along which the removed vehicles can be moved, the pages being of uniform size and shape, the roads ending at complementary places on the edges of the pages to enable placing selective ones of the pages edge to edge with the roads continuing across the pages, different pages having representations of different locales depicted on them so that the vehicle representations moved along the roads are moved past the different locales, said vehicle representations being of a size such that when removed said removed representations can be moved along the roads of said pages while disposed substantially within the edge markings of the roads.

2. The toy of claim 1 wherein the heavy grade page is perforated along the outline of each vehicle representation to facilitate removal of the vehicle representation from the page.

3. The toy of claim 1 including at least one page having roads depicted on it but being otherwise blank so that a child can draw his own choice of geographical locale alongside the roads.

References Cited by the Examiner

UNITED STATES PATENTS

| 1,065,562 | 6/13 | Spoerer | 46—157 X |
| 1,217,632 | 2/17 | Pritchard | 273—157 |
| 1,307,871 | 6/19 | Miller. | |
| 1,537,634 | 5/25 | Watson | 35—42 |
| 1,907,382 | 5/33 | Birdsall | 273—157 |
| 2,189,550 | 2/40 | Higgins | 46—157 |

FOREIGN PATENTS

| 236,373 | 7/25 | Great Britain. |
| 1,216,453 | 11/59 | France. |

DELBERT B. LOWE, *Primary Examiner.*